United States Patent [19]

Morganstein et al.

[11] Patent Number: 4,955,047

[45] Date of Patent: Sep. 4, 1990

[54] AUTOMATED ATTENDANT WITH DIRECT INWARD SYSTEM ACCESS

[75] Inventors: Sanford J. Morganstein, Elgin; Ron H. Bindl, Downers Grove; Mark D. Klecka, Kekalb; Herbert B. Krakau, Elmhurst; Thomas M. Dawson, Lisle, all of Ill.

[73] Assignee: Dytel Corporation, Schaumburg, Ill.

[21] Appl. No.: 346,167

[22] Filed: May 2, 1989

Related U.S. Application Data

[63] Continuation-in-part of Ser. No. 99,388, Sep. 21, 1987, which is a continuation of Ser. No. 593,526, Mar. 26, 1984, Pat. No. 4,696,028.

[51] Int. Cl.$^5$ ............... H04M 3/38; H04M 3/50; H04M 15/12
[52] U.S. Cl. ............... 379/112; 379/88; 379/198; 379/211; 379/233
[58] Field of Search ............... 379/67, 88, 89, 214, 379/216, 233, 198, 196, 208, 112, 211

[56] References Cited

U.S. PATENT DOCUMENTS

| | | | |
|---|---|---|---|
| 3,614,328 | 10/1971 | McNaughton et al. | 379/54 |
| 3,867,582 | 2/1975 | Weed et al. | 379/198 |
| 4,371,752 | 2/1983 | Matthews et al. | 379/89 |
| 4,582,957 | 4/1986 | Hayes et al. | 379/74 |
| 4,696,028 | 9/1987 | Morganstein et al. | 379/88 |
| 4,747,124 | 5/1988 | Ladd | 379/67 |
| 4,783,796 | 11/1988 | Ladd | 379/67 |
| 4,802,199 | 1/1989 | Lange et al. | 379/221 |

Primary Examiner—Thomas W. Brown

[57] ABSTRACT

Apparatus (24) for connecting an outside caller (10) to an extension (14) of a local exchange (16) having a direct inward system access (DISA) feature includes a processor (90) and a memory (93) coupled to the processor (90) for storing at least one predetermined security code. A dialing information receiver (58) is controlled by the processor (90) to receive dialing information input from the outside caller (10). A second memory (94) is coupled to the processor (90) and the receiver (58) for storing the dialing information. A transmitter (58) is coupled to the processor (90) and the local exchanger (16) for transmitting second dialing information related to the dialing information to the local exchange (16). The processor may make a correlation between the dialing information and the second dialing information, or the dialing information may be passed through unchanged as the second dialing information. The apparatus preferably employs a standard trunk connection (34) between the apparatus (24) and the local exchange (16).

8 Claims, 7 Drawing Sheets

AUTOMATED ATTENDANT WITH DIRECT INWARD SYSTEM ACCESS

RELATED APPLICATIONS

This application is a continuation-in-part of Application Ser. No. 07/099,388, filed Sept. 21, 1987, which in turn is a continuation of Application Ser. No. 06/593,526, filed Mar. 26, 1984, now U.S. Pat. No. 4,696,028.

TECHNICAL FIELD OF THE INVENTION

The present invention relates in general to telecommunications systems, and more particularly to automated attendant or intercept systems used in connection with private branch exchanges or key telephone systems that have a direct inward system access (DISA) feature, which auto attendant systems take advantage of the DISA feature to allow the automatic connection of an outside caller to a PBX extension using a non-specialized PBX trunk line.

BACKGROUND OF THE INVENTION

Auto attendant or PBX attendant bypass systems are known in the art for automatically connecting an outside caller through a telephone company central office to an extension of a telephone switching system such as a private branch exchange (PBX), key telephone system or centrex system. An example of such an auto attendant system is given is U.S. Pat. No. 4,696,028, incorporated herein by reference.

In one known form of an auto attendant system, the auto attendant is interposed between the telephone central office serving the called party's business or institution and the switching system serving that same business or institution. In this embodiment, the auto attendant system uses port circuits, either of the normal station type or of the Direct Inward Dial (D.I.D.) type to connect the auto attendant to the switching system. Also, in this embodiment, one-way, trunk. circuits are required.

In a second known form of an auto attendant system, the auto attendant is not directly connected to the telephone company central office, but is connected only to station circuits of the switching system. In this embodiment, the auto attendant depends on incoming calls being routed to it by a common PBX feature sometimes known as Direct In-Line or Direct Department Calling. This feature requires that the auto attendant further use the switching system transfer capabilities in order to extend the call to the inside party selected by the outside party. The use of the conventional switching system transfer capability requires the use of a switch hook flash to alert the switching system that a call transfer is desired. Subsequent to the switchhook flash the outside party is placed on "hold" for varying amounts of time and normal call progress tone indications (such as ringback tone) may not be heard by the caller. Further, in some PBX systems, specialized transfer or conference circuits are automatically assigned by the switching system, therefore requiring additional provisioning of such specialized circuits when an auto attendant is used according to this second method.

There therefore exists a need to bring auto attendant functionality to business or institutional users of switching systems without the limitation of the above described conventional methods.

Many switching systems are equipped with a direct inward system access (DISA) feature. The DISA feature is designed to allow an authorized outside caller to make long distance calls and have them billed to the telephone number associated with the switching system. Such DISA features may also allow the authorized outside person to dial extension numbers of inside personnel and to be connected to such extensions. When a person desires to use the DISA feature, he or she calls a special number of the switching system. The caller hears ringback tone followed by a dial tone (this dial tone would normally confuse a naive caller not knowing what a dial tone meant after a ringback tone). An authorized person then inputs a secret security code. After the reception of this code, the authorized person may make an outgoing long distance call and have the call billed to the business, and specifically to an account associated with the secret code.

The present invention satisfies a need for enhanced access into PBX systems without providing special communication lines by using the DISA feature in combination with existing PBX trunk circuits.

SUMMARY OF THE INVENTION

According to one aspect of the invention, apparatus is provided for connecting an outside caller to an extension of a local exchange having a direct inward system access (DISA) feature. The apparatus includes a memory for storing at least one predetermined security code. A dialing information receiver receives dialing information, such as an extension number or a group code, that is dialed in from the outside caller through the central office. A memory is also provided for storing the received dialing information. Circuitry is provided for either obtaining access to the local exchange in response to the processor receiving the dialing information or to a call completion assistant if no dialing information is received within a predetermined period of time. Once access has been obtained, a transmitter controlled by the processor transmits the stored security code to the local exchange along with second dialing information, such as a selected extension number associated with the received dialing information. Circuitry is further provided for coupling the central office to an extension of the local exchange corresponding to the extension number in response to receiving and correlating the dialing information.

In a preferred embodiment, a dial tone detector is used for detecting a dial tone transmitted from the local exchange in response to its receiving a request for access. The apparatus of the invention then sends the security code and the preselected extension number to the local exchange in response to detecting the dial tone. It is also preferred that a standard PBX trunk be used to interconnect the central office, the apparatus and the private branch exchange, thus obviating the need for specialized PBX communication lines. Because no special lines are needed, a principal advantage of the present invention is that an auto attendant can be installed in front of conventional PBX or other local exchange equipment without extensive modification.

BRIEF DESCRIPTION OF THE DRAWINGS

A more complete understanding of the present invention may be derived by referring to the detailed description and claims when considered in connection with the accompanying drawings in which like reference numbers indicate like features, wherein:

DESCRIPTION OF THE PRIOR ART

In order that the present invention may be more fully appreciated, it will be instructive to first review briefly the structure and operation of an attendant-served PBX switching system coupled to a central office switching system.

Figure 1:
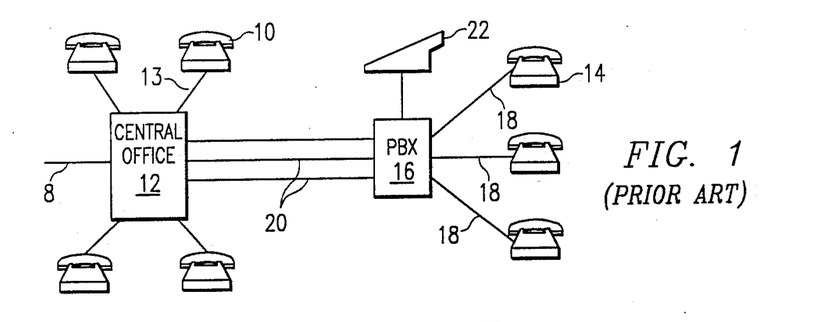
FIG. 1 illustrates a prior art arrangement of an attendant-served PBX switching system and an exemplary central office switching system.

In FIG. 1, there is shown a conventional arrangement for providing telecommunication services between an outside calling party 10 served by a central office switching system 12, and a called party 14 to whom the calling party 10 wishes to speak, where the called party 14 is served by a private branch exchange switching system (PBX) 16 monitored by an attendant 22. The telephone set of the calling party 10 is connected to the central office 12 by one of a plurality of subscriber lines 13, and the extension set of the called party 14 is connected to the PBX 16 by one of the extension lines 18. A plurality of trunks 20 is provided between the central office 12 and the PBX 16 for carrying two-way voice communications therebetween. Communication service may be switched by the central office 12 to trunks 20 from interoffice trunks 8, as well as from CO subscriber lines 13.

PBX switching systems are tailored to provide telecommunications service for business concerns, office buildings and the like, and are generally located on the premises of the parties serviced thereby. Unless the PBX 16 is provided with direct inward station dialing equipment, or is connected to a central office or other switching facility by a specialized line, such as a DID trunk, incoming telephone calls directed toward the PBX 16 must first be intercepted by the switchboard attendant through a switchboard console 22 and then routed through the PBX 16 to the called party 14.

In the majority of instances where the on-premises PBX switching systems 16 are connected to central offices by non-specialized trunks 20, the calling party dials destination determining information (usually a seven- or ten-digit directory number) into the central office 12, whereupon the central office decodes this directory number as specifically identifying the PBX 16. The central office 12 transmits a ringing current over one of the trunks 20 to the PBX 16, and/or grounds the tip conductor of a trunk 20 as an indication that service of the PBX 16 is requested. Since the only signal received by the PBX 16 is a ringing current and-/or ground signal, the system is not able to discern exactly which on-premises PBX telephone to connect to the incoming trunk 20. Therefore, the PBX 16 connects the trunk 20 requesting service to the attendant console 22, and a communication path between the calling party 10 and the attendant 22 is established so that the attendant can speak with the calling party and learn exactly which telephone extension is associated with the person to whom the calling party wishes to speak. When the calling party tells the called party's name or associated extension number to the attendant 22, the attendant dials the pertinent extension number into the PBX 16. As a result, the desired telephone extension 14 is connected to the incoming trunk requesting service and a communication path is thus established between the calling party 10 and the called party 14.

From the foregoing, it is seen that unless a specialized DID trunk is used between the central office 12 and the PBX 16, the intervention of the attendant 22 is a necessity in completing the connection of outside calling parties to the desired station sets 14 of the PBX 16.

In view of this limitation, some PBXs provide a feature known as Direct In Lines or DIL (not to be confused with DISA) in which incoming trunk calls are routed to predefined station sets from among the set of all station handsets 14. In the DISA case, a person answering a ringing station 14 is responsible for determining the desired destination of the call and for extending the call much as the attendant 22 would.

Both cases obtain even though the outside calling party knows the extension number representative of the telephone extension set 14. Because a PBX 16 which is connected to non-specialized trunks normally does not recognize dialing thereon, nothing would be benefited by the calling party 10 dialing the extension number of the party he wishes to call.

In conventional systems, the PBX or other telephone system 16 will usually be equipped with a direct inward system access (DISA) feature. This feature is conventionally used as follows. An executive or other outside caller will dial a telephone number on a subscriber line 13 from the telephone set 10. This telephone number is one that had been previously given to the executive for the DISA feature. The central office 12 transmits a request for service on a dedicated one of the non-specialized trunks 20. In response to receiving the ringing current and/or ground signal, the PBX 16 will generate a dial tone and transmit it back through the central office 12 to the outside caller 10. This dial tone is a signal to the outside caller to enter his or her secret security code. The secret security code thereafter enables the executive to make a call to an extension or to make an outgoing telephone call, such as a long distance call, as if he or she were using one of the telephone sets 14. This outgoing telephone call will then be billed to the firm with which the telephone system 16 is associated.

DETAILED DESCRIPTION OF THE PREFERRED EMBODIMENT

Figure 2:
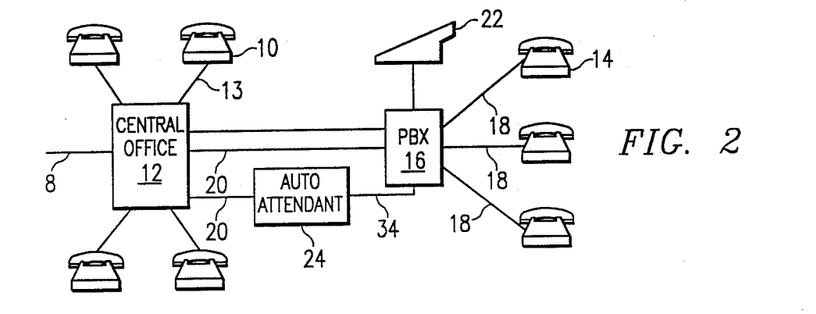
FIG. 2 illustrates the connection arrangement of the PBX switching system of FIG. 1 with the central office employing the auto attendant of the present invention.

FIG. 2 illustrates an environment in which the present invention may be advantageously employed. An auto attendant system 24 according to the present invention is shown in FIG. 2 with an input connected to the central office 12 by a non-specialized trunk 20, and an output connected to the PBX 16 by a non-specialized, standard trunk 34. Although the nonspecialized trunk 20 is shown as an analog trunk, a nonspecialized digital trunk, known as a T-1 trunk, may also be employed in those geographic areas in which the serving central office provides such T-1 service.

The on-premises PBX equipment 16 is adapted to receive an extension number from the outside caller over the standard trunk 34 by programming the PBX 16 with the DISA feature. This feature requires that a security code be dialed to the PBX 16 before the extension number. In response to receiving both the security code and the extension number, the PBX will establish a switched communication path between the trunk 34 and the desired PBX telephone extension 18.

For all practical purposes, the PBX switching system 16 sees the auto attendant 24 as a standard central office trunk programmed with the DISA feature from which destination-determining information is received. In accordance therewith, a communication path is established to the desired telephone extension. To that end, the auto attendant 24 is easily adapted to conventional PBX switching systems with no software or hardware modifications to the switching system 16 other than conventional on-site programming and normal circuit additions. Insofar as the attendant 22 or the called parties 14 are concerned, the auto attendant 24 is completely transparent. By this it is meant that in effecting communication paths the attendant and the called parties are unaware of the intervention of the auto attendant 24, except perhaps that a decrease in workload may be noted by the attendant as a result of the auto attendant 24 taking over this workload.

As seen in FIG. 2, the auto attendant 24 is connected to the PBX 16 by one or more of the standard trunks 34 that can be either of the ground start or loop start variety, or their digital T-1 counterparts. The auto attendant 24 is connected to the central office 12 by a corresponding number of non-specialized loop start or ground start trunks 20, or their respective digital T-1 counterparts.

While the preferred embodiment of the invention will be described in connection for use with a PBX switching system, it should be understood that the invention can be used with equal utility and effectiveness with key telephone systems and other similar on-premises switching systems, as long as these features support the DISA feature. In a broad sense, the invention may effectively be connected between multiple telephone switching systems so as to provide the calling party with an instructional message which, for example, gives the party the option of electing a destination.

Figure 3:
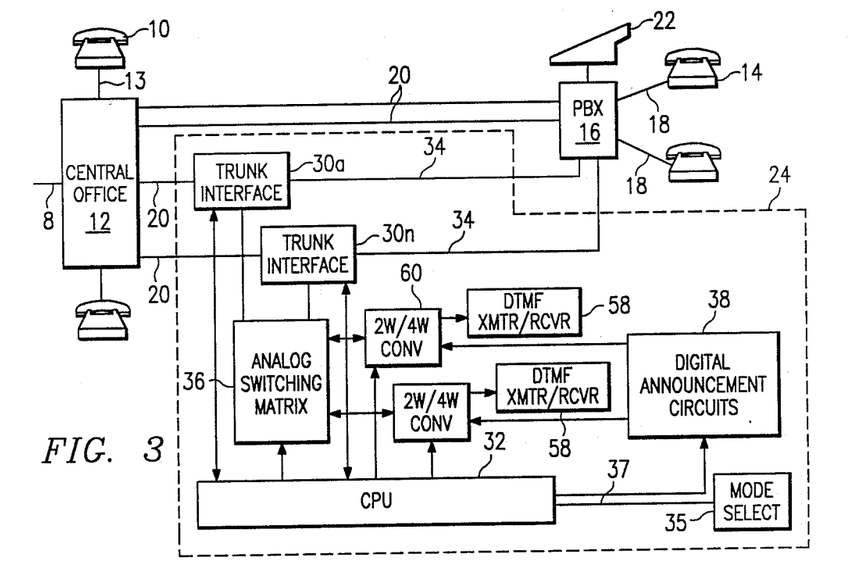
FIG. 3 is a simplified functional block diagram of an auto attendant according to the present invention as interconnected between the central office switching system and the attendant-served PBX switching system of FIG. 2.

FIG. 3 is a more detailed diagram of the auto attendant 24 showing the major functional features in block form. Particularly, the auto attendant 24 (represented by a dashed enclosure) includes a plurality of trunk interfaces 30a–30n for interfacing each non-specialized CO trunk 20 with a corresponding non-specialized PBX trunk 34. As will be described in more detail below, each trunk interface 30a–30n includes circuitry for detecting requests for service in the nature of ringing signals or tip conductor grounds on the trunks 20. In the case where a digital trunk circuit is used, conventional digital signals indicating seizure or disconnect instead of the analog ringing signals or tip conductor grounds are used.

A CPU 32 is connected to those parts of the intercept 24 represented by the functional blocks of FIG. 3. The CPU 32 senses and monitors the system operation and controls the sequence of events to accomplish the overall purpose of the auto attendant 24. As is discussed in greater detail in U.S. Pat. No. 4,696,028, incorporated herein by reference, the software architecture of the present invention is designed to associate the various steps of a call with a "state" which is changed by the CPU 32 as the call progresses to completion.

The operational mode of the auto attendant 24 is controlled by a "mode select" switch 35. In the preferred form, the mode select switch 35 is comprised of a mechanical switch with a number of outputs corresponding to each of three system modes: the full intercept mode, the delayed intercept mode and the cut-through mode. These outputs are represented by a line 37. Each switch output 37 is coupled to the CPU 32. A voltage will appear on one of the outputs 37 to indicate the mode in which the auto attendant 24 should operate.

In addition, the "mode select" switch 35 includes a software routine which can override the switch and which is responsive to the receipt of a special set of digits from the trunk input of the intercept system for placing the system in one of the three exemplary modes of operation. There are provided three such sets of special digits, one for each of the modes. A more detailed description of the software mode selector is set forth in U.S. Pat. No. 4,696,028.

The auto attendant 24 will be described herein as operating in its full intercept mode. "Delayed intercept" and "cut-through" modes of operation are fully described in U.S. Pat. No. 4,696,028. With reference then to FIG. 3, when the CPU 32 senses a request for service on one of the trunks 20, a search for an idle DTMF receiver 58 is conducted and the selected receiver is connected by the CPU 32 to the trunk through an analog switching matrix 36. When digital T-1 trunks are employed, the trunk interfaces 30a–30n may, in one embodiment, convert the digital signals to analog signals so that the trunk type is transparent to the analog circuits that are included in the illustrated embodiment of the auto attendant 24. With the analog switching matrix 36, the CPU can connect any one of the plurality of DTMF receivers 58 to any one of the non-specialized CO trunks 20 to thereby collect dialing information from the calling party 10.

Up to this point in the call sequence neither the calling party 10 nor the central office 12 is aware, nor need be aware, of the existence of the auto attendant 24 associated with the PBX switching system 16. After the auto attendant 24 has recognized a request for service, the CPU 32 appropriately connects a digital announcement circuit 38 to a trunk interface 30x (being one of the trunk interfaces 30a–30n) through the analog switching matrix 36 so as to be in communication with the calling party 10. Without delay, an announcement message is then transmitted to the caller. This announcement may advise the caller of the name of the business concern that has been reached, and then further instructs the caller to dial the extension number of the desired extension telephone 14 (FIG. 2) through which he desires to communicate with the called party. According to this announcement message, the calling party can then dial the telephone extension number. This number is collected by the selected DTMF receiver 58 and is sensed by the CPU 32.

With the signaling circuits in the trunk interface 30a, the CPU 32 seizes a standard PBX trunk 34. The CPU 32 requests service from the PBX 16 by applying conventional ringing signals, in a manner to be further described below, to the conventional PBX trunk 34. In the case of digital T-1 service, conventional digital "request for service" signals are sent to the PBX 16 instead.

The PBX 16 responds to these ringing signals by closing the loop on the trunk circuit 34 upon which the ringing signals are detected. This loop closure is detected by the involved trunk interface 30x as loop current flowing in the PBX trunk circuit 34. The CPU 32 is notified of this detection. Upon the detection of the loop current, or further upon the detection of a dial tone transmitted by the PBX 16 on the standard trunk line 34, the CPU 32 will cause the outpulsing of a predefined security code previously stored in its memory to the PBX 16. This security code will enable the DISA feature of the PBX 16. The CPU thereafter will cause the outpulsing of the dialing information that it had received from the calling party 10 and had stored to the PBX 16 (or other stored dialing information that the CPU correlates to the received dialing information, such as outpulsing a "pilot" number when a group code is received) over the standard communication trunk 34.

The PBX switching system 16 then uses the dialing information to provide a switched communication path between the called station extension set 14 and the PBX standard trunk line 34. Simultaneously, the CPU 32 connects the PBX standard trunk 34 to the CO trunk 20 to thus effect a communication path between the calling party 10 and the called party 14. It is seen that with the provision of the auto attendant 24 the assistance of the PBX operator or attendant 22 is in many instances eliminated. In doing so, information from the calling party has been solicited and used to the fullest extent such that PBX operator assistance is no longer required, at least when in the full intercept mode and when the calling party knows the extension number of the party to be called.

The analog switching matrix 36 initially establishes a bidirectional communication path between the calling party 10 and the digital announcement circuit 38. With this arrangement the calling party may dial the PBX extension number (or group code, etc.) while he is listening to the instructional message. The extension number is then received and stored by the DTMF receiver 58. Upon detecting the first dialed digit, the CPU 32 disconnects the message transmission directed to the calling party. This aspect is especially advantageous to callers who are familiar with the PBX intercept system and thus are able to expedite their call by dialing the PBX extension number even before the instructional message has been fully transmitted.

The present invention also accounts for those instances in which the calling party does not know or does not remember the telephone extension number of the party to whom he wishes to speak. In this latter instance, the instructional message stored in the digital announcement circuit 38 continues the message with an instruction to the caller for him or her to dial the PBX attendant number (generally "0") in the event the extension number is not known and assistance is required to be given by the attendant. The exemplary message contains yet another instruction which tells the calling party 10 that if he desires to wait for a short period of time, the operator 22 will be automatically connected to him or her to assist in completing the call. If the message has been transmitted and no dialing information has been received, the CPU 32 assumes that no such information will be forthcoming. After a predetermined period of time the auto attendant 24 will automatically outpulse the attendant 22's extension number to the PBX 16 so that the calling party 10 will be assisted. With this arrangement, the attendant 22 can communicate with the calling party 10 and search the directory for the called party's directory number, and then dial such number into the PBX switching system 16. A communication path is then completed between the calling party 10 and the called party 14.

While the outpulsing of the attendant's telephone number (as a last resort) is described in the illustrated example, it is well within the ambit of the invention to outpulse other programmed telephone numbers for assistance, such as a guard station after hours, or the telephone number of a person who may occasionally assume the operator's responsibilities. Also, upon recognizing the dialing of "0" by the calling party, the auto attendant 24 has the capability of outpulsing, for example, a four-digit extension number which truly identifies the attendant console 22.

Exemplary System Hardware

Figure 4:
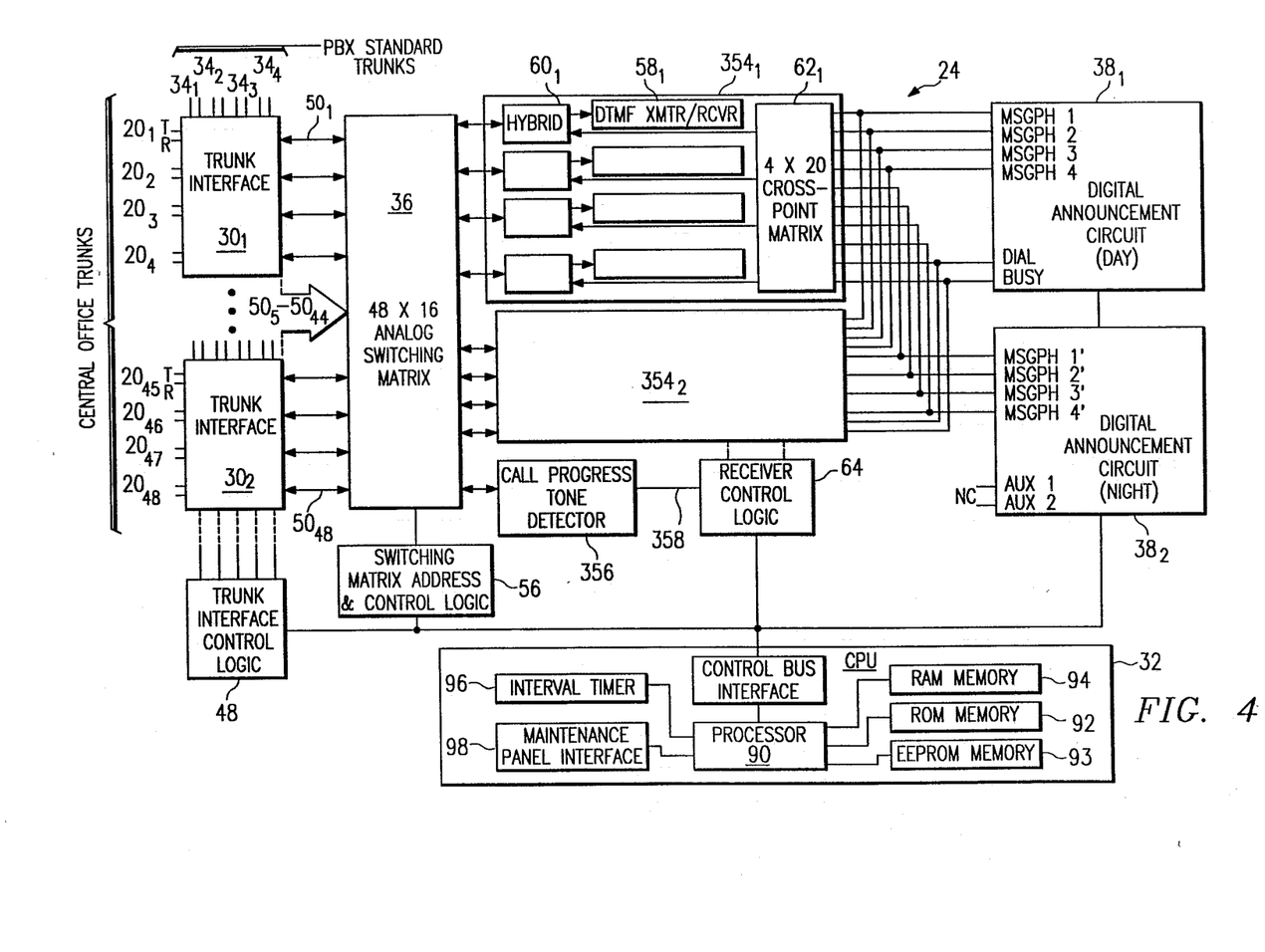
FIG. 4 is a more detailed block diagram of the auto attendant system according to the preferred embodiment of the present invention.
Figure 5:
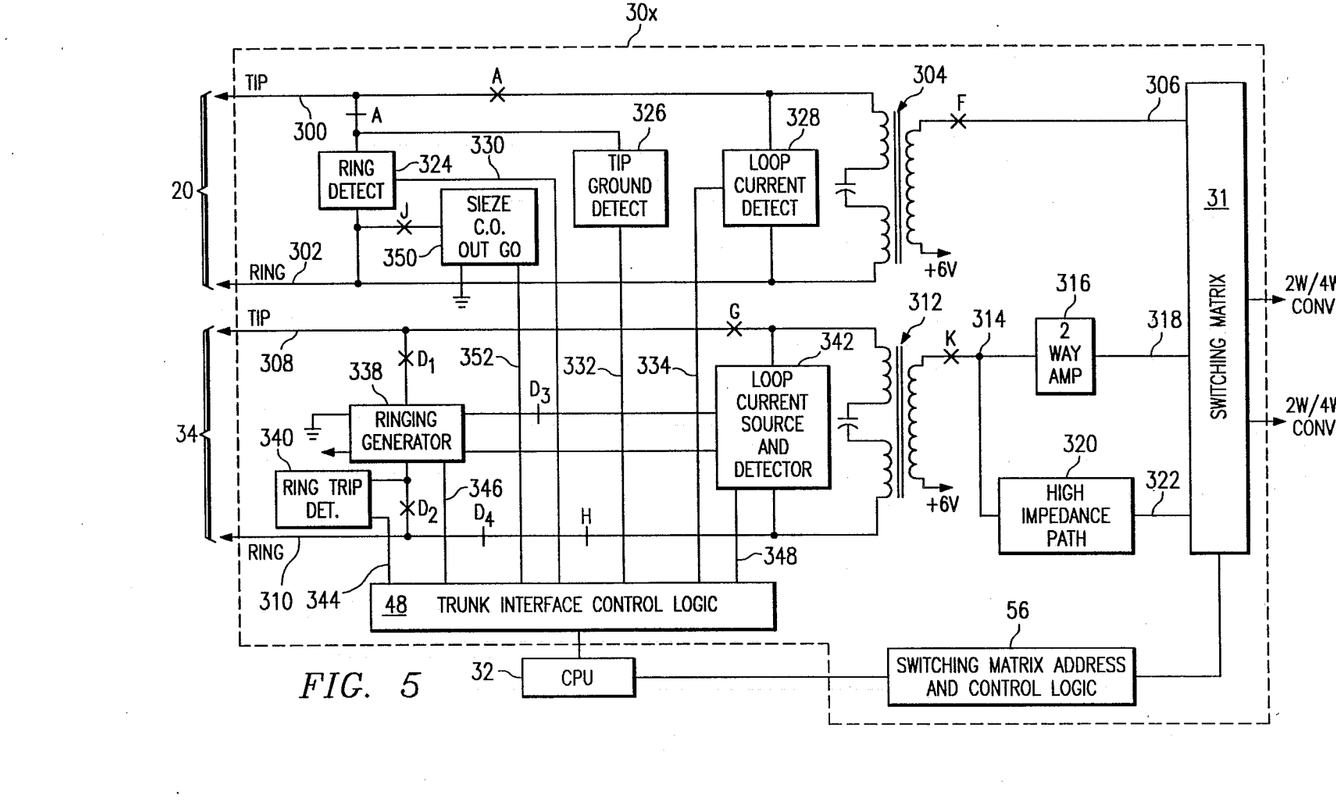
FIG. 5 is an electrical diagram of a three-port trunk interface circuit according to the invention.

Having described the basic operational principles of the auto attendant 24, attention is now directed to FIGS. 4 and 5 for a detailed description of the apparatus according to the invention. While some of the functional parts of the auto attendant 24 are well known in the telecommunications art, and a further detailed discussion would only encumber the description hereof, the auto attendant 24 uses a unique arrangement of these components to accomplish the new results discussed herein.

According to an analog embodiment of the auto attendant 24, there is provided a three-port trunk interface circuit 30x as shown in FIG. 5. The interface circuit 30x (one of interfaces 30a-30n) is indicated by the dashed enclosure. It is within the scope of the invention to replace the illustrated analog interface circuit 30x with corresponding digital interface circuitry in the case that digital T-1 trunks are provided from the central office. A digital version of the interface circuit 30x will also affect the design of hybrid circuits 60 (FIG. 4), call process tone detector 356 and their controls.

In the illustrated, analog embodiment, the standard central office trunk 20 makes up one port of the interface circuit 30x, and includes a tip conductor 300 and a ring conductor 302. Tip and ring conductors 300 and 302 are coupled by a transformer 304 to a port 306 connected to the switching matrix 36. A tip conductor 308 and a ring conductor 310 constitute a standard PBX trunk 34, and are coupled through a transformer indicated generally at 312 to a node 314. The node 314 is connected through a two-way amplifier 316 to a port 318, which in turn is coupled to the switching matrix 36. The node 314 is further coupled through a high-impedance path 320 to a port 322 that is in turn coupled to the switching matrix 36.

A ring detector 324 is connected between the tip conductor 300 and the ring conductor 302 to detect ringing requests for service. The ring detector 324 is connected to the tip conductor 300 through a normally closed relay A, with which a normally open relay A on the tip conductor 300 is associated. A tip ground detector 326 is also connected to the tip conductor 300 through the normally closed relay A for detecting grounded tip conductor requests for service. A loop current detector 328 is connected between the tip conductor 300 and the ring conductor 302. Monitor and control conductors 330, 332 and 334 connect the respective detectors 324, 326 and 328 to the trunk interface control logic circuit 48, which is in turn connected to the CPU 32.

Near the PBX port 34, a ringing generator 338 is connected between the PBX tip conductor 308 and the PBX ring conductor 310 through associated, normally open relays $D_1$ and $D_2$. A ring trip detector 340 is connected to the ring conductor 310 through the normally open relay $D_2$. A loop current source and detector circuit 342 is connected between the tip conductor 308 and the ring conductor 310. A normally open relay G is disposed toward the PBX port 34 from the loop current and reverse battery detector 342 on the tip conductor 308. A normally closed relay H is disposed on the ring conductor 310 towards the PBX 34 from the detector 342. Control and sensor lines 344, 346 and 348 respectively connect the detector 340, the ringing generator 338 and the loop current source and detector 342 to the control logic circuit 48. Returning briefly to the central office side of the interface, a "seize" central office circuit 350 is connected to the central office ring conductor 302 through a normally open relay J. A control/signal line 352 connects the circuit 350 to the control logic circuit 48. The CPU 32 is programmed to receive signals from the various detectors and to control the relays and generators of the interface 30x according to a procedure that will be described in detail below.

The circuitry of the auto attendant 24 is shown in general in FIG. 4. A plurality of trunk interfaces $30_1$, $30_2$, ... $30n$ each correspond to four of the trunk interfaces 30x shown in FIG. 5. Each trunk interface $30_1$–$30n$ in FIG. 4 has four pairs of central office trunks $20_1$–$20_4$ as well as four pairs of standard PBX trunks $34_1$–$34_4$. Each trunk interface $30_1$–$30n$ provides one PBX standard trunk 34 for every central office trunk 20. The outlet of the switch matrix ports 306, 318 and 322 in FIG. 5 is represented by one of the lines $50_1$–$50_{48}$ in FIG. 4.

The 48×9 analog switching matrix 36 includes a plurality of solid state crosspoint chips for connecting any one of its plurality of trunk interface inputs $50_1$–$50_{48}$ to anyone of the DTMF information receivers/transmitters $58_1$–$58_n$. The connection between the ports of the switching matrix 36 and the DTMF receivers/transmitters $58_1$–$58_n$ are made through respective two wire/four wire hybrid circuits $60_1$–$60_n$. Each hybrid circuit 60 allows a bidirectional flow of information on its switching matrix side, and independent, unidirectional and oppositely-directed flows of information on its other side. As seen in FIG. 4, analog information on the four-wire output side of the hybrid 60 is directed to the DTMF receiver/transmitter 58, and analog instructional information is received from the digital announcement circuit 38. In the illustrated embodiment, the receivers/transmitters $58_1$–$58_n$ are arranged in blocks 354 of four. Each two wire/four wire circuit $60_x$ is connected to a port of a 4×20 crosspoint matrix $62_1$. A second block $354_2$ is organized in a similar manner to the four-receiver block $354_1$.

In the illustrated embodiment, two digital announcement circuits are provided a day digital announcement circuit $38_1$ and a night digital announcement circuit $38_2$. Each of the digital announcement circuits $38_1$ and $38_2$ have four message phone output terminals MSGPH1–MSGPH4. The output terminals of crosspoint matrix $62_1$ are connected in parallel to the output terminals of matrix $62_2$ (not shown; a portion of block $354_2$) so that each such matrix can receive any message or signal producible by either digit announcement circuit $38_1$ and $38_2$.

The day digital announcement circuit $38_1$ includes a dial tone and a busy tone which are also selectable by each cross point matrix $62_1$ and $62_2$. The digital announcement circuit $38_2$ has two optional outputs for auxiliary tones, if desired.

Digital announcement circuits $38_1$ and $38_2$ digitally store messages in the continuously variable slope delta modulation format. Each digital announcement circuit $38_1$ and $38_2$ stores one complete message which is processed and output on terminals MSGPh1–MSGPh4 as four twenty-four second messages each skewed by six seconds. In this manner the beginning of a 24 second message is available to the calling party every six seconds. The message in announcement circuit $38_1$ includes, for example, a message useful for daytime instructions. Such a message may be "Thank you for calling Dytel Corporation. If you are dialing from a push button phone you may dial your party's telephone extension number during this message. If you need assistance please wait and an operator will help you. For sales you may dial 1, or service 2." Of course, other pertinent messages may be used to suit the desired needs of the user.

Any two or more of the two-wire to four-wire hybrids 60 may be simultaneously crossconnected to the same matrix port to receive the message next starting at the next skewed interval of time.

There is further provided a call process tone detector 356 that is connected to the 48×16 analog switching matrix 36 and is connected by a signal line 358 to a receiver control logic circuit 64. The receiver control logic 64 couples and decodes CPU commands from the CPU 32 to the dial information receiver blocks 354 to provide coordinated cross connects between the two wire/four wire hybrid circuits 60 and the announcement circuits 38. It should be understood that the four ports of each of the cross point matrices $62_1$ and $62_2$ may be simultaneously connected to any of the ten ports on the other side of the matrix.

The overall control of the auto attendant 24 is performed by the CPU 32. Switching paths within the analog switching network 36 are set up and removed under the control of the CPU 32, which sends address information to the address and control logic circuit 56. The address and control logic circuit 56 decodes the address information to determine if a connection is to be set up or removed, and also to determine exactly which trunk interface input is to be cross-connected to a desired DTMF receiver/transmitter 58.

With primary reference to FIG. 5, the auto attendant 24 operates as follows. A ring and/or tip signal is sent on the conductors 302 and 300 from the central office to request service. The ring signal is detected by the ring detector 324, while a tip/ground signal is detected by the detector 326. Appropriate signals are sent on lines 330 and 332 to the control logic block 48, and from thence to CPU 32. The CPU 32 will scan the DTMF receivers $58_1$ to determine their availability. The CPU 32 will select one of the DTMF receivers 58 that is idle for connection to the central office conductors 300 and 302 through the analog switching matrix 36. The CPU 32 will operate relay A to trip ringing, and relay F, the cross point matrix 36 and the cross point matrix 62 (FIG. 4) to connect the tip and ring conductors 300 and 302 (FIG. 5) to the digital announcement circuit $38_1$. The digital announcement circuit $38_1$ (FIG. 4) then sends a digital announcement to the caller through the central office along tip and ring conductors 300 and 302.

The outside caller next inputs a number (or other dialing information, such as a group code) in response to the digital announcement. This four-digit number is received by the selected DTMF receiver 58 and sent to the CPU 32. The digital announcement circuit $38_1$ or $38_2$ is disconnected upon the receipt by a DTMF receiver/transmitter 58 of a first digit.

In response to storing a complete extension number, the CPU 32 will close the normally open relays $D_1$ and $D_2$ and will open the normally closed relays $D_3$ and $D_4$, and will actuate the ringing generator 338 to generate ringing current on the PBX standard trunk conductor 310. In response to the generation of ring voltage, the PBX 16 will close a loop in its circuit. If ring trip occurs during a ringing cycle, the ring trip detector 340 senses the loop closure as a drop in impedance, and in response thereto opens relays $D_1$, $D_2$, $D_3$ and $D_4$ and closes relay G in order for the loop current source detector 342 to also sense this loop closure. If ring trip occurs during the time that ring voltage is not present then the loop current detect circuit 342 detects the PBX answer signal. The CPU unit 32 will, in response to detecting the loop closure, close relay K.

Conventional PBX units 16 that are equipped with a DISA feature will next generate a dial tone on the PBX standard trunk conductors 308 and 310 as a prompt to the outside caller for entering the security code. According to the present invention, the CPU 32 readies the auto attendant 24 for the reception of this dial tone by connecting the call progress tone detector 356 (FIG. 4) through the analog switching matrix 36. The dial tone will thus be received by the detector 356 from the PBX unit 16, and detector 356 will appropriately notify CPU 32 of this event. In response to this, the CPU 32 will operate the analog switching matrix 36 to connect a DTMF receiver/transmitter 58 to the standard trunk conductors 34. The CPU 32 then instructs the selected DTMF transmitter/receiver 58 to outpulse the security code to the PBX 16, followed by the extension number. This extension number may equal an extension number previously received by the selected one of the DTMF receivers/transmitters 58, or it may be generated as a result of CPU 32's correlation of the received dialing information (such as a group code) with an extension number stored in its memory. The security code is stored in a memory associated with CPU 32 such as an EEPROM 93 (FIG. 4). In response to receiving the security code and the extension number, the PBX 16 will connect the outside caller to the appropriate one of its extensions 14.

After the last digit is outpulsed from the DTMF transmitter/receiver 58, the CPU 32 operates the switching matrix 36 to connect the central office tip and ring conductors 300 and 302 to one of the call progress tone detectors 356. The call progress tone detectors are used to monitor for busy or no answer conditions of the selected destinations as described in U.S. Pat. No. 4,696,028 incorporated herein by reference. If the destination answers, then the CPU 32 connects the central office tip and ring conductors 300 and 302 to the standard PBX trunk tip and ring conductors 308 and 310. Note that relays A, F, G, H and K are closed to complete the connection between the outside caller and the desired extension.

Exemplary System Software

Having described in detail the operation of the PBX intercept hardware, the sequence of steps as determined by the CPU program will next be described. The bottom of FIG. 4 is illustrative of the general architecture of the CPU 32 for achieving the objects of the invention. The processor 90 of the CPU is a microprocessor, such as a Zilog Z80A integrated circuit. The read only memory (ROM) 92 contains the instructions which are executed by the processor 90 to carry out the various functions of the auto attendant equipment to accomplish the overall desired result. An electrically erasable and programmable read-only memory (EEPROM) 93 is used to receive and store one or more security codes as indexed by the extension numbers to which they pertain.

The random access memory (RAM) 94 provides the processor 90 with a scratch pad memory for storing transient information relating to the progress of a call in the system. The RAM 94 is sectioned into blocks of memory denoted as Trunk Control Buffers (TCBs) each of which are associated with an incoming central office trunk 20. Each TCB contains subfields of memory used to identify the state of a call, the identity of the DTMF decoder 58 assigned to particular trunk interfaces, timing fields for counting various time intervals, and the number of times a message has been repeated to a calling party. Additional information, such as the current message phase, fault counts, and other information relevant to processing calls is kept in the TCB. The RAM memory 94 also includes a plurality of Register Control Buffers (RCBs) for storing the dialed information received from the calling party, as well as subfields for storing the identity of the particular trunk interface through which dialed extension digits are received, and the number of digits received.

The events referred to in the previous paragraph which are stored in the TCB pertain to changes in condition relevant to the calls processed by the auto attendant 24. Some examples of these conditions are: digit detection by a DTMF receiver/transmitter 58, a call origination to the auto attendant 24 by the central office 12 as indicated by a tip ground sensed by the tip ground detector 326 of a trunk interface 30x, or the expiration of a timer. These events indicate that something has occurred which should be considered in light of the call processing step in the sequence of operations in which a call has progressed (called the state of the call) when the event occurred. The combination of the event and the current state of the call are used together to determine what action or actions should be taken to process the call toward the next step in the sequence of steps as was discussed above, and also to determine the next state.

The interval timer 96 is connected to the interrupt input of the processor 90 and provides the processor with real-time intervals of approximately ten milliseconds. While not essential to the operation of the auto attendant 24, a maintenance panel interface 98 allows a technician to interrogate the system and determine the operation status or general working order of the system.

The sequence of steps through which the present invention undergoes in performing its function is shown in FIGS. 6 through 13. As noted above, as an incoming call is processed by the auto attendant 24, a series of states are assigned to the call as it progresses to completion. The program of the CPU 32 includes a base level executive program 100 (FIG. 6) from which the processor departs to execute a sequence of steps relating to a given state to which a call has been assigned. It is this program to which the processor 90 is returned from the various other programs as depicted in FIGS. 7-13.

Figure 6:
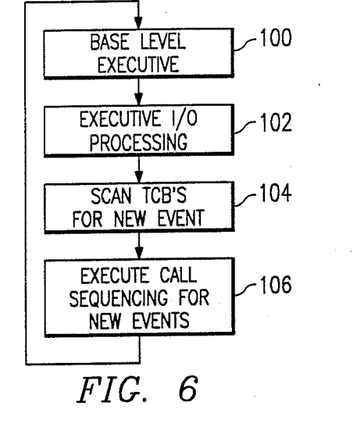
FIGS. 6 through 13 comprise flow charts of the various call states through which the auto attendant system progresses in carrying out its intended function.

According to FIG. 6, from the base level program 100 the processor 90 proceeds to execute any I/O processing 102 for the maintenance panel. Then the processor 90 scans the above mentioned TCBs of RAM 94 to determine if new events have occurred for any of the trunk interfaces. If any new events are discovered by this scan, then the processor 90 proceeds to function block 106 where call sequencing operations are carried out, as shown more fully in FIGS. 8 through 13.

Figure 7:
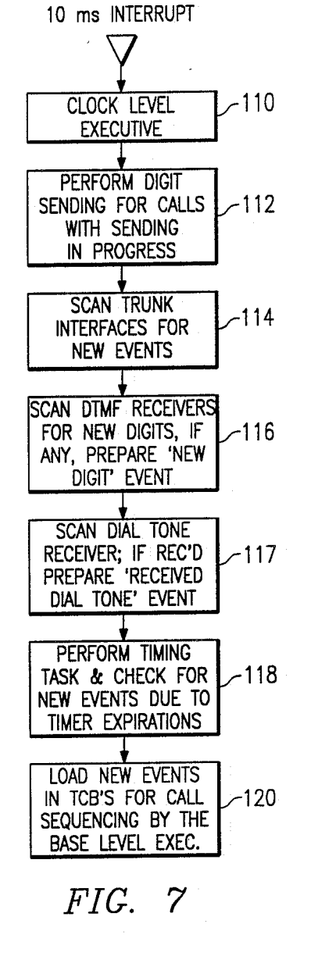

FIG. 7 depicts the clock level executive program 110 which is entered by the processor 90 every 10 milliseconds as determined by a signal on its interrupt input (not shown). The clock level executive program 110 performs tasks which require the need for timed intervals. Among these tasks is the performance at 112 of digit sending for calls with sending in progress. It is the function of this task to operate the DTMF receiver/transmitter 58 in the proper timed sequence to cause valid DTMF digits to be dialed to the PBX 16 on the standard PBX trunk line 34. When rotary-type signals are desired, block 112 will release the G relay of the trunk interface 30x in the proper timed sequence to cause valid rotary-type digits to be dialed to the PBX 16 on the trunk line 34.

Another task 114 requiring timed intervals is the scanning of trunk interfaces for new events. To perform this task, the processor 90 accesses the status of the various trunk interface detecting circuits using the control logic 48 of the respective trunk interfaces 30a-30n. The processor 90 maintains a record of the previous status of the detecting circuits in RAM memory 94. By comparing this record with the current status acquired during the scanning task, the processor 90 is able to determine when a change in status has occurred. Such changes are converted into the appropriate event to be stored in the corresponding TCB for later use by the base level executive program in determining the proper steps needed for processing the call.

A third task 116 requiring timed intervals is the task of scanning the DTMF receivers/transmitters 58 for the receipt of new digits. This is done through the receiver control logic 64 in conjunction with a capability of the DTMF receiver 58 to provide an indication accessible by the processor 90 when a new digit has been received. If a new digit is received, the processor 90 prepares a new digit event to be loaded into the TCB of the trunk interface 30x associated with the particular DTMF transmitter/receiver 58 which received the digit.

A fourth task 117 is the scanning of call process tone detector 356 to ascertain whether a dial tone is received. In a preferred embodiment, the processor 90 will ready a previously selected DTMF transmitter/receiver 58 for outpulsing of a security code only in response to the receipt of a dial tone from the PBX 16.

A fourth task 118 requiring timed intervals involves performing the timing tasks and checking for new events due to the expiration of timers. The processor 90 must be able to detect when a call has been in a particular state for more than a specific amount of time in order to determine when to proceed in processing the call. One example of this need is when the system is operating in the delayed intercept mode, wherein there is a need to determine when a call has been ringing for the PBX operator 22 for a specified intercept delay time without receiving an answer signal from the PBX. After the expiration of this predetermined interval of time in this mode the call must be intercepted and the caller given an opportunity to complete his own call. Timing for cases such as this is performed by the timing task 118.

The processor 90 keeps data areas in RAM memory 94, referred to as timers, for this purpose. The timers are loaded with appropriate values by the processor 90 when performing the call sequencing task 106 (FIG. 6). The timing task 118 subtracts one from the timer value each time a fixed amount of time has elapsed. When the timing task finds that a timer value has reached zero (after successive subtractions) the timer expires and the appropriate timeout event is prepared to be loaded in the corresponding TCB to initiate further sequencing of the call.

A final task 120 of clock level executive 110 is the loading of any new events determined by the other clock level executive tasks into appropriate TCBs for call sequencing by the base level executive.

Figure 8:
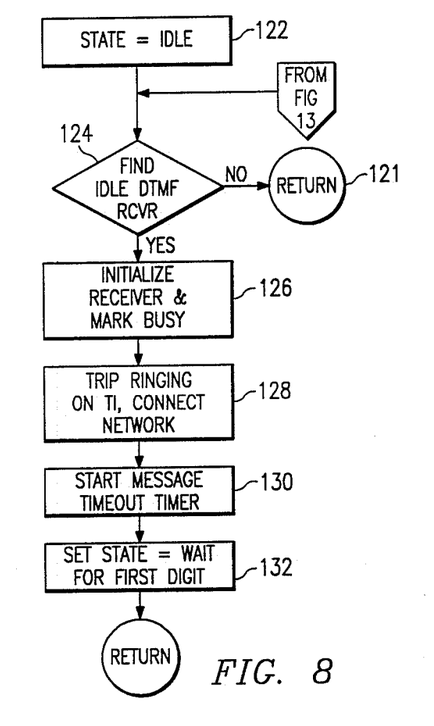

FIG. 8 shows the sequence of steps carried out by the processor 90 when the event processed is the detection of a new call by the presence of ringing on an incoming CO trunk 20. Initially, the state of the particular incoming trunk is noted as being Idle in the TCB as shown by block 122. When in the mode where all calls are intercepted and according to the RAM memory map of the state of the PBX intercept apparatus 24, the processor 90 searches 124 for an idle DTMF receiver 58.

If all of the DTMF receivers 58 are busy, the processor returns 121 to the base level program 100. Based upon the frequency of occurrence of incoming calls over CO trunks 20 in the PBX, the intercept 24 is designed to statistically accommodate the majority of new calls. If the memory map shows that a DTMF transmitter/receiver 58 is idle and thus available, the processor proceeds at step 126 to initialize that receiver and mark it busy in such memory map. When marked busy, the DTMF transmitter/receiver 58 becomes dedicated to the particular incoming trunk 20 for receiving digits thereover and for transfer of the digits to the receiver control logic 64. When the processor 90 secures a DTMF receiver 58 for use, two command instructions are issued from the processor 90 to first, trip ringing at 128 in the trunk interface to signal the central office 12 of acknowledgment of the call, and second, to cause a connection to be established in the analog switching matrix 36 for connecting the requesting incoming trunk 20 to the idle DTMF transmitter/receiver 58.

The CPU 32 maintains current information as to the status of each phase of the skewed message output from the digital announcement circuit 38. Accordingly at step 130, the CPU 32 selects the message phase which commences at least within the next six seconds, and issues a command instruction to the crosspoint matrix 62 (through the receiver control logic 64) to establish a matrix connection between the next-starting message phase and the two-wire to four-wire hybrid 60 assigned, by virtue of the switching matrix 36 crossconnect, and thus to the CO trunk 20 requesting service. In addition, as noted by block 130 of FIG. 8, the CPU 32 starts a timer which is used to determine whether telephone extension digits have been received pursuant to the instructional message transmitted to the calling party. As noted by functional block 132, the processor 90 sets the state of the illustrative call in the TCB to "Wait For First Digit". The processor 90 then returns to the base level program 100.

Figure 9:
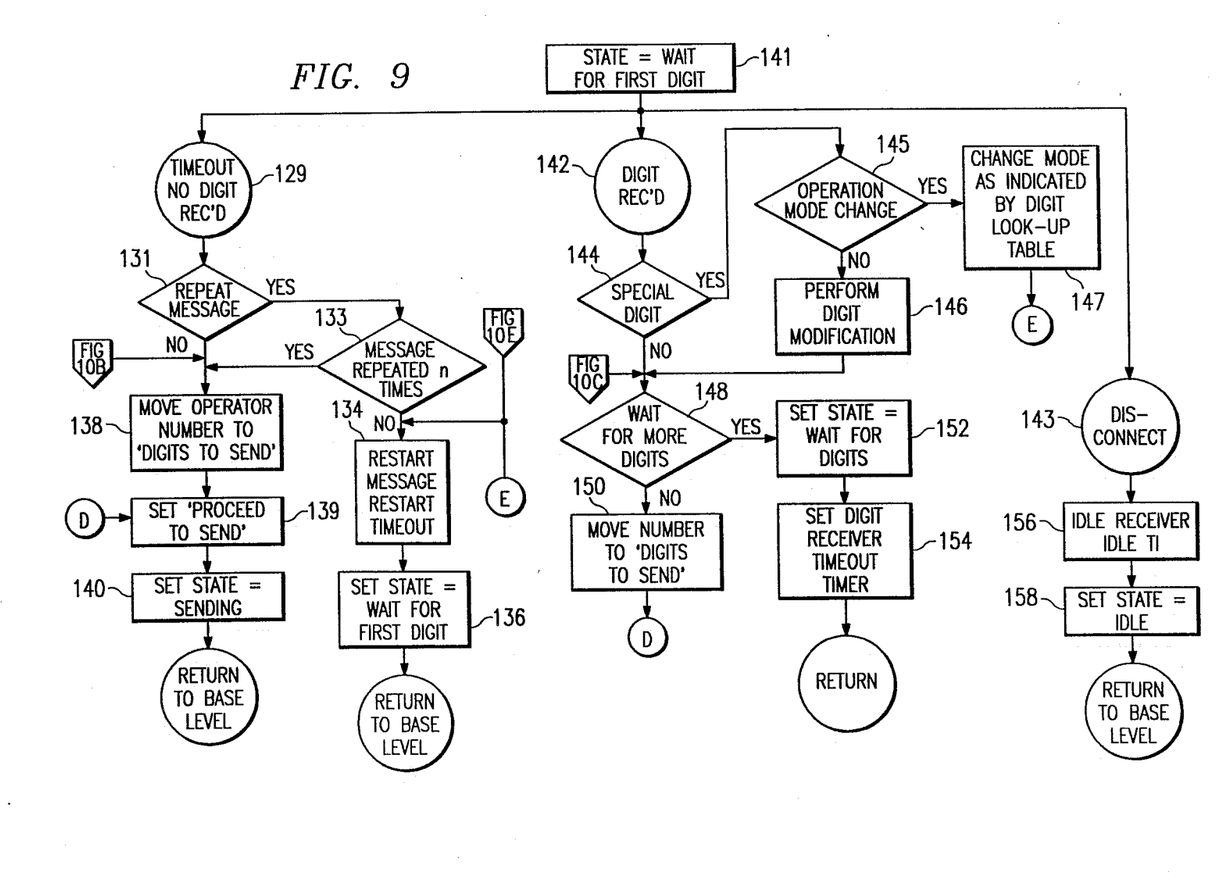

FIG. 9 illustrates the processor operations concomitant with the "Wait For First Digit" state of the exemplary call. The left hand part of FIG. 9 shows the branch taken by the processor 90 if a timeout 129 has occurred and no digit has yet been received from the calling party. Based upon the programming determinations of the particular installation, the message directed to the calling party may be repeated at step 131 until a predetermined number of times has elapsed at step 133, whereupon the message is restarted and the time period reinitiated at step 134. The state of the call is maintained at "Wait For First Digit" at step 136.

If the message is not to be repeated, or has been repeated a predetermined number of times, it can safely be assumed that the calling party desires the assistance of the operator, and thus the extension number of the operator or attendant is prepared for sending to the PBX over the PBX standard trunk line 34, as noted in functional block 138. In this situation the state of the call is set to "Sending" at 140 and the attendant or operator's number is transmitted to the PBX switching system 16 by first sending the security code stored in memory followed by the operator's number using the DTMF transmitter/receiver 58. While the illustrated embodiment employs DTMF signaling as a means of transmitting dialing information to the PBX 16, the transmission of rotary dial pulse signals may also be used.

Figure 10:
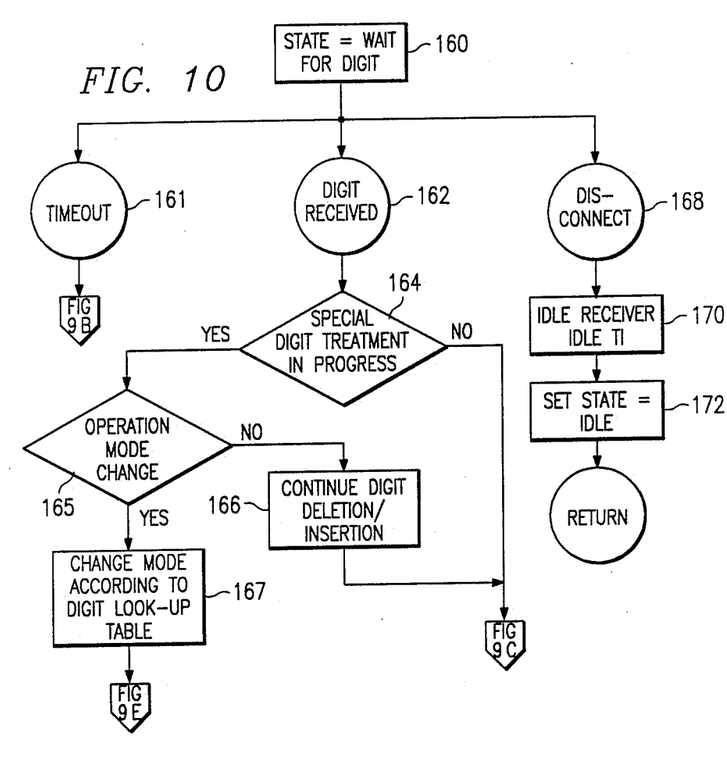

In the event a digit has been received by the DTMF receiver 58 during the state "Wait For First Digit", the "digit received" functional block 142 is entered by the processor 90. The first digit received is analyzed at 144 to determine if it is a special digit which requires further processing. One of the types of further processing is the change of mode of operation of the auto attendant 24 at step 145 when the dialed digits found in a Look-up Table so indicate. Mode checking is performed as indicated in FIGS. 9 and 10. After the RAM memory 94 locations used by the processor to store the current mode of operation are altered at 147 to show a newly requested mode of operation, the message is repeated at step 134 to allow the caller an opportunity to complete the desired call.

In another type of further processing, the invention provides for conventional digit deletion, modification or insertion at step 146 before sending the resultant digits to the PBX switching system 16. For PBX systems 16 that have the DISA feature, the received digit information must be preceded by the digits of the corresponding security code, which the processor looks up in EEPROM 93. Digit modification or translation may also be desired where, for instance, a person served by the PBX system 16 is temporarily located at a different extension, whereby the caller's dialing of the party's prior extension will result in the outpulsing from the auto attendant equipment 24 of the security code plus the new extension number where the called party can be reached. This feature can be accomplished by using a software look-up table which is referred to by the processor 90 to check the table against the dialed number to determine if digit modification is required. If the dialed number is found in the table, then the processor 90 is directed to a correlation table where the dialed number is correlated to the number outpulsed to the PBX switching system 16. For example, single digit dialed numbers such as "0" (operator), "1" (sales) or "2" (service) may be found by the processor 90 in the look-up table, and then correlated to respective extension numbers 5321, 5872 and 5881 which are appropriately outpulsed to the PBX 16. This scheme works best when the abbreviated digits are not the same as the most significant digits of the PBX extension number plan. Also, this feature is not limited to single digit abbreviated dialing as illustrated, but is applicable to multiple digit dialing.

DISA features commonly allow an employee located out of the office to place a call to the PBX, enter the security code and then dial back out of the office by entering a "9" or other predetermined digit, followed by the desired destination telephone number. The call is then billed to the extension. Since the present invention automatically adds the security code, this dial-back-out capability may be undesirable as it would allow any member of the public to make such a call. The dial-back-out capability may be disabled by inspecting the first digit of the dialing information for a "9". If the processor sees a "9", any number of actions can be taken, such as disconnecting the call, routing the call to the PBX attendant or sending another voice prompt to the caller.

Most commonly, and as concerns nonabbreviated dialing, the first digit received will be the most significant digit of the number assigned to one of the PBX extensions, and thus will not be delineated as a special digit in the look-up table. In such a case, the processor 90, after having received the first digit will wait for more digits at 148, and upon the receipt of the full number of digits of the extension number, the processor will move the security code digits and the extension number digits to the "Digit to Send" sub-field of the TCB at step 150. The security code and the full complement of digits having been received is prepared for outpulsing by entering the "Sending" state at step 140 through the intermediate state "Proceed to Send" at step 139.

In the event the system determines at functional block 148 that more digits are to be received, the state of the call is set to "Wait for Digits" at 152, and the digit reception time-out timer is set at step 154.

While not shown in the illustrated embodiment, the technique of overlapping the receipt of subsequent digits with the sending of digits to the PBX 16 may be employed to expedite the processing of the call. In the illustrated embodiment, however, the sending of the digits to the PBX switching system 16 commences when the end of dialing has been determined. As noted above, sending of digits to the PBX 16 is initiated by moving the required digits to the "Digit to Send" sub-field of the TCB, releasing the digit receiver register and the network connection associated therewith. The call is then set to the "Sending" state and the processing of another call is commenced by returning to the base level program 100 (FIG. 6).

Should a disconnect event be received at 143 while a call is in the "Wait For First Digit" state at 141, the DTMF transmitter/receiver 58, the analog switching matrix 36 and the trunk interface 30x are idled at step 156. The call is set to the "Idle" state at 158 and return is had to the base level program 100.

With reference now to FIG. 10, there is shown the actions performed by the auto attendant 24 when a call is in the "Wait for Digit" state 160. If a timeout event occurs at 161, actions are then taken to connect the call to an operator or other predefined destination as noted previously. If a "Digit Received" event at 162 occurs, a determination is made at 164 of whether special digit treatment, as previously described is necessary, and if so it is then carried out. It is then determined whether more digits are to be received or if the receipt of digits has terminated and the appropriate actions are carried out as noted above. If a "Disconnect" event occurs at 168 while the call is in the "Wait for Digit" state 160, the DTMF receiver 58 and trunk interface 30x are idled at 170, the call is set to the "Idle" state at 172 and again return is had to the base level program 100.

Figure 11:
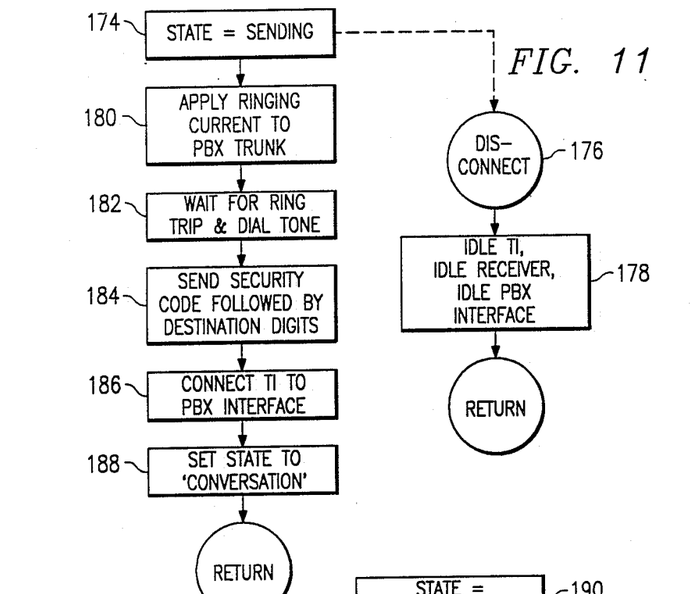

FIG. 11 illustrates the actions performed by the illustrated embodiment of the present invention when a call is in the "Sending" state 174. If a "Disconnect" event is received at 176, the trunk interface 30x is idled, and if a DTMF transmitter/receiver 58 is in use it too is idled at 178, along with the network connection and the interface 30x. A return to base level program 100 is then executed.

If, on the other hand, no "Disconnect" event is received, the auto attendant 24 seizes the PBX switching system at 180 by applying conventional ringing signals to the PBX standard trunk 34 (FIG. 5). The auto attendant 24, according to the illustrative call, then waits at 182 for the receipt of either a loop closure, or a loop closure and a dial tone, from the PBX 16 to acknowledge the seizure of the PBX switching system. If such an acknowledgement is received, the processor 90 at step 184 causes the transmission to the PBX 16 of the predefined security code stored in memory, which the PBX 16 uses to enable its DISA feature. The extension digits are immediately transmitted thereafter. Both the security code and the extension digits are transmitted using prescribed digit and inter-digit timing criteria. In the event that such an acknowledgment is not received within a predetermined period of time, a timeout at 182 is executed.

After the digits are sent to the PBX 16 the trunk interface 30x is connected to the PBX switching system at step 186 while the PBX 16 completes the processing of the transmitted digits to establish a call path between the standard PBX trunk 34 and the called telephone extension 14. The state of the call is then set to the "Conversation" state at 188.

While the illustrated embodiment provides for the receipt of dialing information from the calling party, and the examination of such information before the subsequent transmission thereof to the PBX 16, it may be preferred to pass the dialing information directly through the trunk interface 30x to the PBX switching system 16 without intermediate examination or processing. However, in the illustrated embodiment, maximum control is had over the dialing information by providing for digit examination and/or modification.

Figure 12:
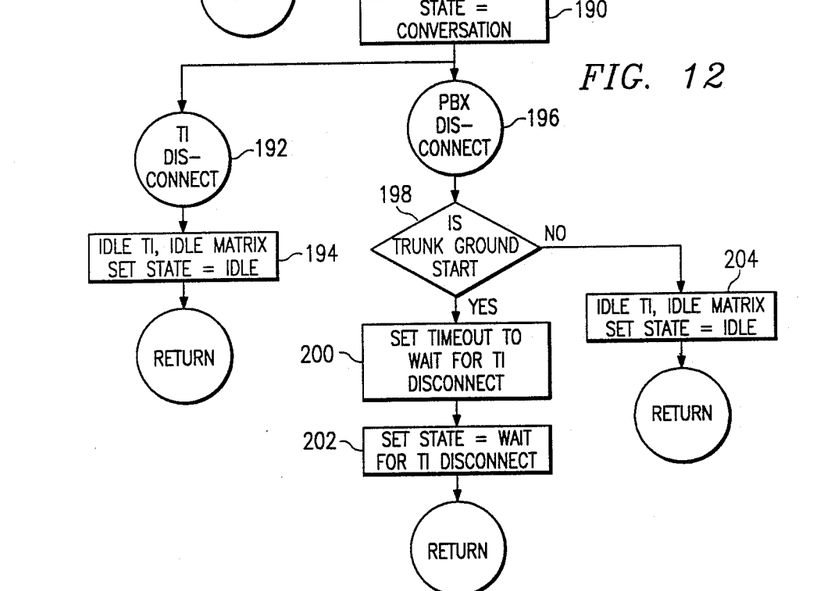

After the dialing information has been transferred to the PBX switching system 16, the auto attendant 24 sets the state of the illustrated call to "Conversation" at 190, as shown in FIG. 12. During the processing of a call the auto attendant 24 monitors the input ports (trunk interfaces 30a–30n) and its output ports (PBX interfaces) to determine if disconnect signals or indications appear on either such port. In accordance with another important feature of the invention, the auto attendant 24 can determine when the conversation has ended from the PBX side of the system. An advantage flowing from this aspect of the invention is that after the conversation between the calling party and the called party has been terminated by an on-hook condition by the called party, the calling party can place additional calls through the auto attendant 24 without the need to also go on-hook by simply dialing again to place additional calls to the PBX 16. With reference to this feature in FIG. 13, the CPU 32 determines if the CO side trunk is of the disconnect supervision type at 198, and if so, the software sets the timeout for a "Wait for TI Disconnect" at 200 and the state of the call is also set to the "Wait for TI Disconnect" state at 202. If, on the other hand, the CO communication line 34 is not of the disconnect suspension type trunk, the trunk interface is set to the "Idle" state at 204 irrespective of which party went on-hook. Again, return is then had to the base level program 100.

Figure 13:
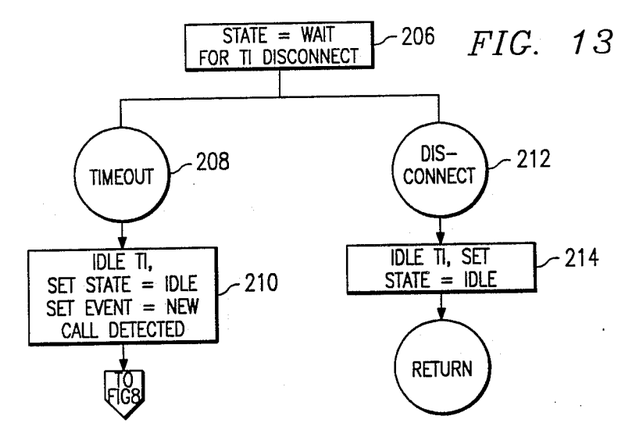

FIG. 13 illustrates the situation, as noted above, where the calling party 10 has not gone on-hook after the completion of a call, but rather wishes to initiate another call to the PBX switching system 16. While in the "Wait for TI Disconnect" state at 206, and if a timeout event at 208 occurs signifying that the calling party 10 has not disconnected, then the system software sets the state of the call to "Idle" and the event to "New Call Detected" at 210. In this manner the auto attendant 24 acts on the call as if it were a new call, and the processor 90 proceeds in accordance with the "Idle" state 122 as shown in FIG. 8.

With regard yet to FIG. 13, if a "Disconnect Event" at 212 is detected the pertinent trunk interface 30x is idled and the call is set to the "Idle" state at 214. Return is then again had to the base level program 100.

From the foregoing it is seen that the auto attendant 24 provides an enhanced capability when used in conjunction with an attendant-served on-premises switching system. With the provision of the present invention callers may more directly and more expeditiously complete calls to desired telephone station sets. As a result, the attendant associated with the on-premises system is relieved of the task of completing calls in those instances where assistance is not actually required, whereby the attention of the attendant can be more readily directed to those calls which indeed require assistance, i.e., where the telephone number of the party to be called is not known by the calling party. In addition, the auto attendant serves, in certain situations, as an intermediate system for completing a plurality of calls from a calling party to an on-premises system without the need of the calling party going on-hook after each such call.

Various modifications of the illustrated embodiment may be made without departing from the spirit of the invention. For example, the outside switching system 12 need not be of the central office type as illustratively described above, but rather need only be some type of facility which is capable of transmitting communications intelligence. The invention is thus not to be restricted to the specific forms shown or the uses mentioned, but only by the scope and spirit of the appended claims.

What is claimed is:

1. Apparatus for connecting an outside caller to an extension of a local exchange having a direct inward system access (DISA) feature, comprising:
   a processor;
   a memory coupled to said processor storing at least one predetermined security code;
   a dialing information receiver controlled by said processor for receiving dialing information including a group code input from an outside caller;
   a memory coupled to said processor and said receiver for storing said dialing information, and storing second dialing information including the extension number of said extension, said processor operable to correlate said dialing information with said second dialing information; and a transmitter coupled to said processor and said local exchange for transmitting said security code and second dialing information to said local exchange.

2. Apparatus for connecting an outside caller to an extension of a local exchange having a direct inward system access (DISA) feature, comprising:

a processor;

a memory coupled to said processor storing at least one predetermined security code;

a dialing information receiver controlled by said processor for receiving dialing information including a group code input from an outside caller, a predetermined digit of said dialing information disabling a dial back out capability when detected by said processor;

a memory coupled to said processor and said receiver for storing said dialing information, and storing second dialing information including the extension number of said extension, said processor operable to correlate said dialing information with said second dialing information; and a transmitter coupled to said processor and said local exchange for transmitting said security code and second dialing information to said local exchange.

3. Apparatus for connecting an outside caller to an extension of a local exchange having a direct inward system access feature, comprising:

a processor;

a memory coupled to said processor for storing at least one predetermined security code;

a dialing information receiver controlled by said processor for receiving dialing information input from an outside caller;

a memory coupled to said processor and said receiver for storing said dialing information;

a transmitter coupled to said processor and said local exchange for transmitting said security code and second dialing information relating to said dialing information to said local exchange; and at least one standard telephone trunk for connecting said apparatus to said local exchange.

4. Apparatus for connecting an outside caller to an extension of a local exchange having a direct inward system access (DISA) feature, comprising:

a processor;

a memory coupled to said processor for storing at least one predetermined security code;

a dialing information receiver controlled by said processor for receiving dialing information input from an outside caller;

a memory coupled to said processor and said receiver for storing said dialing information;

a transmitter coupled to said processor and said local exchange for transmitting said security code and second dialing information related to said dialing information to said local exchange; and a switch matrix controlled by said processor for selectively coupling said receiver to said outside caller, said transmitter to said local exchange, and said local exchange to said outside caller.

5. Apparatus for connecting an outside caller to an extension of a local exchange having a direct inward system access (DISA) feature, comprising:

a processor;

a memory coupled to said processor for storing at least one predetermined security code;

a dialing information receiver controlled by said processor for receiving dialing information input from an outside caller;

a memory coupled to said processor and said receiver for storing said dialing information;

a transmitter coupled to said processor and said local exchange for transmitting said security code and second dialing information relating to said dialing information to said local exchange;

interface circuitry controlled by said processor for obtaining access to the local exchange, said interface circuitry further operable by said processor to couple said outside caller to an extension of said local exchange corresponding to said second dialing information after said local exchange has received said security code and said second dialing information;

a dial tone receiver controlled by said processor and coupled to said local exchange for receiving a dial tone therefrom; and a ring generator of said interface circuitry operable by said processor to transmit ringing current to said local exchange, said local exchange generating said dial tone in response to receiving said ringing current, said interface circuitry operable by said processor for selectively coupling said outside caller to said local exchange in response to said dial tone receiver receiving said dial tone.

6. Apparatus for connecting an outside caller to an extension of a local exchange having a direct inward system access (DISA) feature, comprising:

a processor;

a memory coupled to said processor storing at least one predetermined security code;

a dialing information receiver controlled by said processor for receiving dialing information including a group code input from an outside caller, a leading digit of said dialing information when matched by said processor to a predetermined digit prevents an outside caller from placing an outside call and billing said call to said local exchange;

a memory coupled to said processor and said receiver for storing said dialing information; and a transmitter coupled to said processor and said local exchange for transmitting said security code and second dialing information related to said dialing information to said local exchange.

7. Apparatus for connecting an outside telephone caller to an extension of a private branch exchange switching system, comprising:

a request-for-service detector coupled to a central office trunk for detecting a service request transmitted on said trunk and operable to generate a service request signal in response thereto;

a processor coupled to said detector for receiving said service request signal;

a switching matrix controlled by said processor for selectively coupling said central office trunk to said private branch exchange switching system;

at least one receiver coupled to said processor and selectively coupled by said switching matrix to said central office trunk for receiving dialing information from an outside caller coupled to the central office;

said processor operable to receive said dialing information from said receiver, a memory associated with said processor for storing at least one security code;

a ringing generator controlled by said processor, a standard trunk line coupling said private branch exchange to said switching matrix, said ringing generator coupled to said switching matrix for selectively transmitting ring current to said private branch exchange, said private branch exchange operable to close a current loop including said standard trunk line in response to said ring current;

a loop current detector coupled to said standard trunk line for detecting said loop current, said loop current detector coupled to said processor for transmitting a loop current detection signal in response to detecting said loop current; and said processor operable to receive said loop current detection signal and causing a DTMF transmitter coupled thereto to transmit said security code through said switching matrix to said private branch exchange followed by second dialing information related to said dialing information, and further operating said switching matrix to effect a connection between said private branch exchange and said central office after said private branch exchange acknowledges said ring current.

8. The apparatus of claim 7, and further comprising a dial tone detector selectively coupled through said switching matrix to said private branch exchange by said processor for receiving a dial tone therefrom, said private branch exchange operable to transmit a dial tone upon receiving said ring current, circuitry including said switching matrix operable by said processor to connect said central office to said private branch exchange upon the receipt by said dial tone detector of said dial tone.

* * * * *

UNITED STATES PATENT AND TRADEMARK OFFICE
CERTIFICATE OF CORRECTION

PATENT NO. : 4,955,047

DATED : September 4, 1990

INVENTOR(S) : Sanford J. Morganstein, et al.

It is certified that error appears in the above-identified patent and that said Letters Patent is hereby corrected as shown below:

On the title page:

Item [75], change "Kekalb" to "Dekalb".

Signed and Sealed this

Thirty-first Day of December, 1991

Attest:

HARRY F. MANBECK, JR.

Attesting Officer     Commissioner of Patents and Trademarks